United States Patent
Oikawa et al.

(10) Patent No.: US 10,855,126 B2
(45) Date of Patent: Dec. 1, 2020

(54) ELECTRIC MOTOR AND AIR CONDITIONER

(71) Applicant: Mitsubishi Electric Corporation, Tokyo (JP)

(72) Inventors: Tomoaki Oikawa, Tokyo (JP); Mineo Yamamoto, Tokyo (JP); Hiroyuki Ishii, Tokyo (JP); Hiroki Aso, Tokyo (JP); Junichiro Oya, Tokyo (JP); Yuto Urabe, Tokyo (JP); Takaya Shimokawa, Tokyo (JP); Koji Yabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 127 days.

(21) Appl. No.: 15/758,481

(22) PCT Filed: Nov. 18, 2015

(86) PCT No.: PCT/JP2015/082418
§ 371 (c)(1),
(2) Date: Mar. 8, 2018

(87) PCT Pub. No.: WO2017/085814
PCT Pub. Date: May 26, 2017

(65) Prior Publication Data
US 2018/0219438 A1  Aug. 2, 2018

(51) Int. Cl.
*H02K 1/27* (2006.01)
*H02K 21/16* (2006.01)
(Continued)

(52) U.S. Cl.
CPC ............ *H02K 1/2753* (2013.01); *H02K 1/27* (2013.01); *H02K 1/276* (2013.01); *H02K 21/16* (2013.01);
(Continued)

(58) Field of Classification Search
CPC .. H02K 9/20; H02K 1/27; H02K 9/19; H02K 15/03; H02K 1/276; H02K 2213/03; H02K 21/16; H02K 1/2753; H02K 1/2746
See application file for complete search history.

(56) References Cited

U.S. PATENT DOCUMENTS

| 5,223,759 A | 6/1993 | Shimoda et al. |
| 5,369,325 A | 11/1994 | Nagate et al. |

(Continued)

FOREIGN PATENT DOCUMENTS

| CN | 1058863 A | 2/1992 |
| JP | H04-071342 A | 3/1992 |

(Continued)

OTHER PUBLICATIONS

Office action dated Jun. 21, 2019 issued in corresponding CN patent application No. 201580084512.3 (and English translation thereof).
(Continued)

*Primary Examiner* — Tran N Nguyen
*Assistant Examiner* — Leda T Pham
(74) *Attorney, Agent, or Firm* — Posz Law Group, PLC (57) ABSTRACT

An electric motor includes a stator and a consequent-pole-type rotor including an annular rotor core disposed on an inner side of the stator and a plurality of permanent magnets disposed inside the rotor core and arrayed in a circumferential direction of the rotor core. The rotor core includes at least one slit provided inside the rotor core and disposed on an outer side of each of the permanent magnets in a radial direction of the rotor core, and at least one slit provided on an outer circumferential surface of the rotor core and disposed between the permanent magnets adjacent to each other.

15 Claims, 9 Drawing Sheets

(51) Int. Cl.
*F24F 1/0018* (2019.01)
*F24F 13/24* (2006.01)

(52) U.S. Cl.
CPC ............. *F24F 1/0018* (2013.01); *F24F 13/24* (2013.01); *H02K 2213/03* (2013.01)

(56) References Cited

U.S. PATENT DOCUMENTS

| | | | | |
|---|---|---|---|---|
| 5,508,576 A * | 4/1996 | Nagate | ................... | C08L 23/02 |
| | | | | 310/156.54 |
| 6,917,133 B2 * | 7/2005 | Koharagi | ............. | H02K 1/2766 |
| | | | | 310/156.48 |
| 7,105,971 B2 * | 9/2006 | Asai | ....................... | H02K 21/14 |
| | | | | 310/156.45 |
| 10,320,254 B2 * | 6/2019 | Nakano | .................. | H02K 29/03 |
| 2007/0063607 A1 * | 3/2007 | Hattori | ................. | H02K 1/2766 |
| | | | | 310/156.53 |
| 2013/0140922 A1 * | 6/2013 | Yabe | .................... | H02K 1/2706 |
| | | | | 310/51 |
| 2015/0280502 A1 * | 10/2015 | Hirotani | ............... | H02K 1/2706 |
| | | | | 310/68 R |
| 2015/0357892 A1 | 12/2015 | Nakano et al. | | |
| 2018/0219438 A1 * | 8/2018 | Oikawa | .................. | H02K 21/16 |

FOREIGN PATENT DOCUMENTS

| | | |
|---|---|---|
| JP | 2011-083119 A | 4/2011 |
| JP | 2012-105410 A | 5/2012 |
| JP | 2012-244783 A | 12/2012 |
| WO | 2014/174572 A1 | 10/2014 |

OTHER PUBLICATIONS

International Search Report of the International Searching Authority dated Feb. 23, 2016 for the corresponding international application No. PCT/JP2015/082418 (and English translation).
Office action dated Feb. 26, 2019 issued in corresponding KR application No. 10-2018-7008683 (and English translation thereof).
Office Action dated Mar. 3, 2020 issued in corresponding CN patent application No. 201580084512.3 (and English translation).

* cited by examiner

ELECTRIC MOTOR AND AIR CONDITIONER

CROSS REFERENCE TO RELATED APPLICATION

This application is a U.S. national stage application of International Patent Application No. PCT/JP2015/082418 filed on Nov. 18, 2015, the disclosure of which is incorporated herein by reference.

TECHNICAL FIELD

The present invention relates to an electric motor including a consequent-pole-type rotor, and an air conditioner including the electric motor.

BACKGROUND

To improve an energy saving property of an air conditioner, in general, a rare earth magnet having high energy density such as a neodymium sintered magnet has been used in a permanent magnet of an electric motor mounted on a compressor of the air conditioner. An electric motor using the neodymium sintered magnet has been developed for a fan of the air conditioner.

Such a permanent magnet is expensive because the permanent magnet contains a precious rare earth element. For this reason, there is a strong demand for reducing the amount of use and machining expenses of the permanent magnet to thereby reduce the cost.

In general, a permanent magnet is formed by cutting a block of mass and machining the cut mass into a designated shape. As a result, the machining expenses increase as the number of permanent magnets used in the electric motor is larger.

A method of reducing the number of permanent magnets used in the electric motor includes providing a rotor with a so-called consequent pole arrangement. For the consequent-pole-type rotor, the magnet magnetic pole formed by the permanent magnet and the salient pole formed not by the permanent magnet but in the core material are alternately arrayed in the circumferential direction (Patent Literature 1). That is, the number of the magnet magnetic poles is a half of the number of poles of the rotor, and the number of the salient poles is a half of the number of poles of the rotor. The magnet magnetic poles, which amount to the half number of the rotor poles, have the same polarities. The salient poles, which amount to the other half number of the poles, have polarities different from the polarities of the magnet magnetic poles. That is, the consequent-pole-type rotor has the permanent magnets whose number is a half of the number of the permanent magnets of the typical rotor.

For the consequent-pole-type rotor, unfortunately, the magnet magnetic poles differ in inductance from the salient poles. Such an imbalance in the inductance poses a problem of the vibration and noise increasing.

To solve the problem, Patent Literature 1 discloses a rotor of a surface-magnet-and-consequent-pole type. For this type of rotor disclosed in Patent Literature 1, an air gap between the stator and the rotor is not uniform in the circumferential direction.

Specifically, the distance of the air gap at the magnet magnetic pole is smaller than the distance of the air gap at the salient pole to thereby reduce the magnetic imbalance between the magnet magnetic pole and the salient pole and thus achieve the reduction in vibration and noise.

PATENT LITERATURE

Patent Literature 1: Japanese Patent Application Laid-Open No. 2011-83119

When the technology described in Patent Literature 1 is used to enlarge the air gap between the stator and the rotor to adjust the inductance for reducing the imbalance in the inductance, unfortunately, the magnetic flux decreases, which leads to the efficiency deterioration. When the air gap is reduced to adjust the inductance, on the other hand, the margin for the assemblage manufacturing is decreased.

SUMMARY

The present invention has been devised in view of the above, and an object of the present invention is to provide an electric motor capable of reducing the cost, the vibration, and the noise.

To solve the above problem and achieve the object, the present invention provides an electric motor comprising: an annular stator; and a consequent-pole-type rotor comprising an annular rotor core disposed on an inner side of the annular stator, and a plurality of permanent magnets disposed inside the annular rotor core and arrayed in a circumferential direction of the annular rotor core, wherein the annular rotor core has at least one first slit provided inside the annular rotor core, the at least one first slit being disposed on an outer side of each of the permanent magnets in a radial direction of the annular rotor core, and at least one second slit provided on an outer circumferential surface of the annular rotor core, the at least one second slit being disposed between the permanent magnets adjacent to one another.

The present invention achieves an effect of reducing the cost, the vibration, and the noise.

DETAILED DESCRIPTION

Electric motors and an air conditioner according to embodiments of the present invention are explained in detail bellow with reference to the drawings. Note that the present invention is not limited by the embodiments.

First Embodiment

Figure 1:
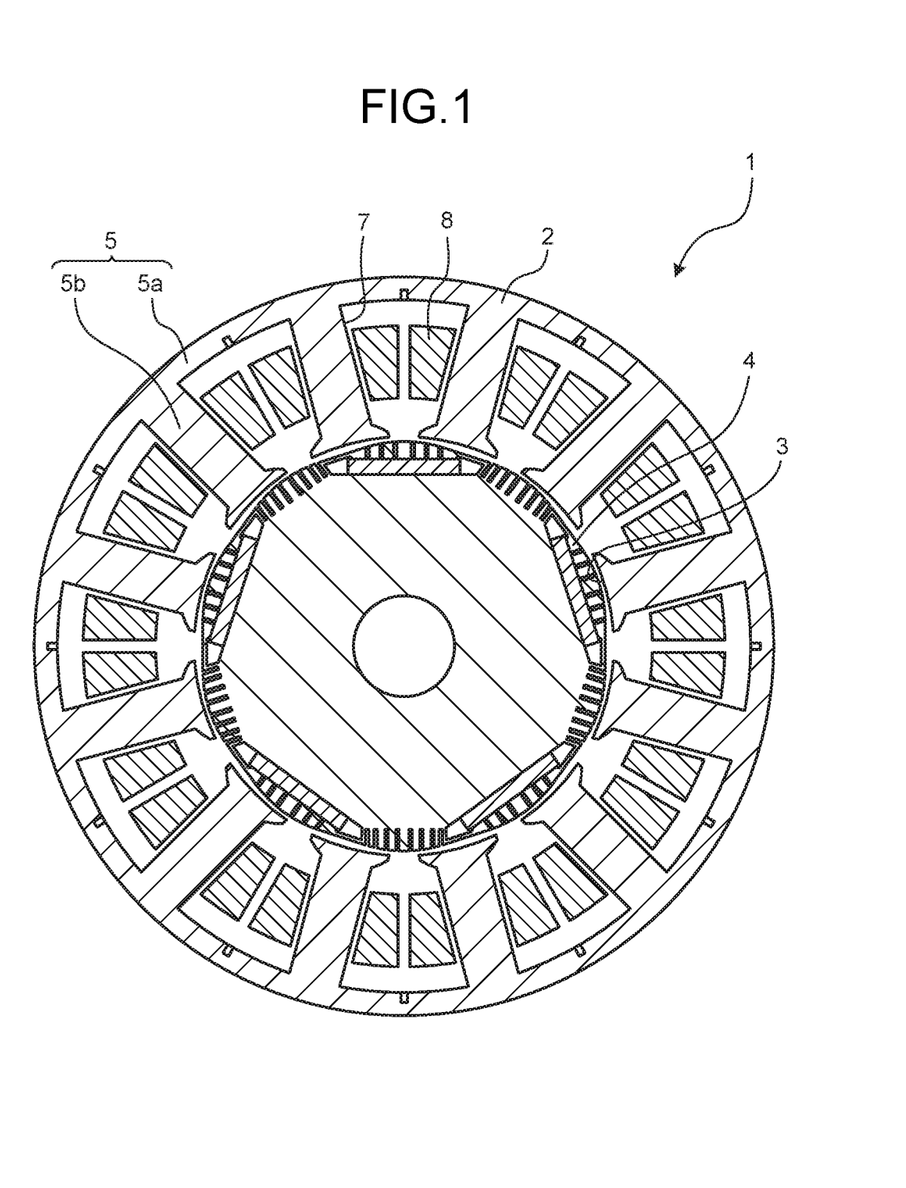
FIG. 1 is a sectional view illustrating the configuration of an electric motor according to a first embodiment.
Figure 2:
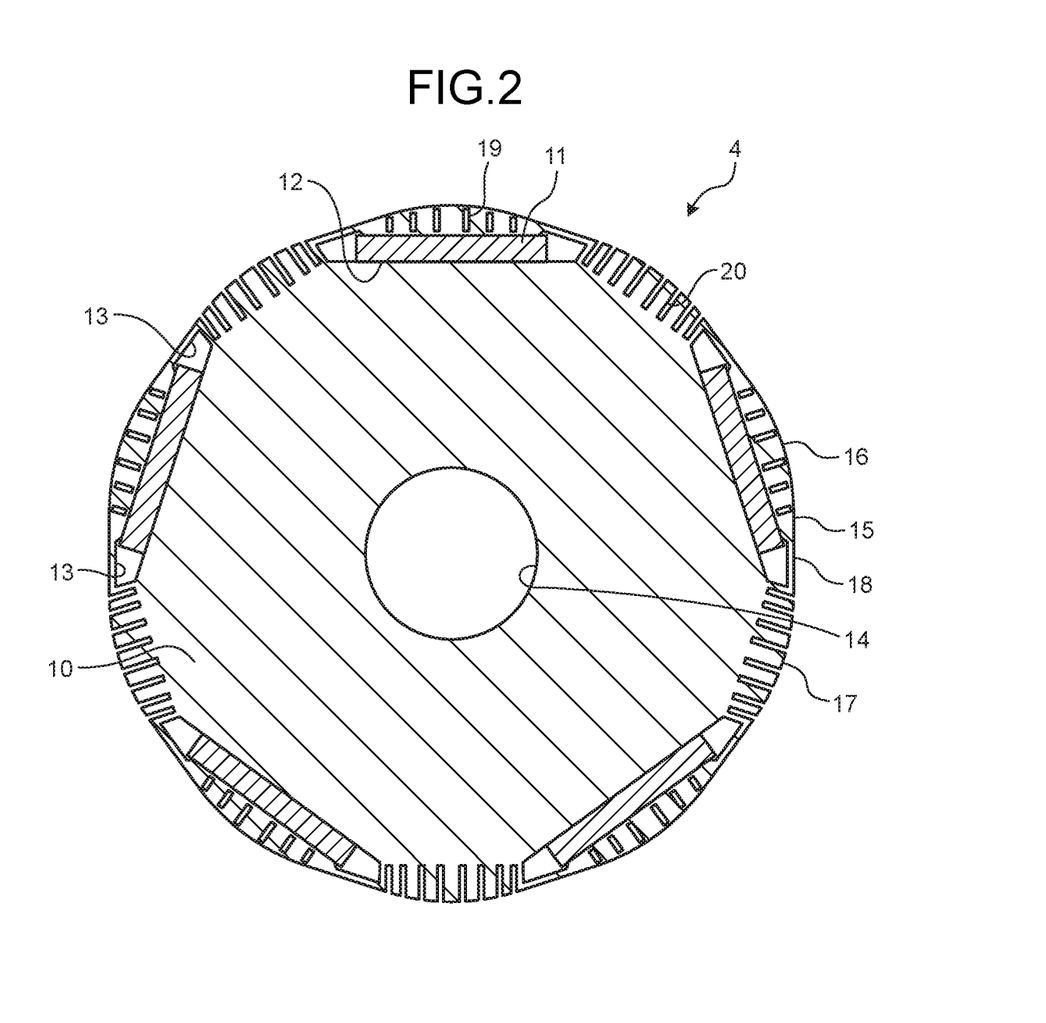
FIG. 2 is a sectional view illustrating the configuration of a rotor according to the first embodiment.
Figure 3:
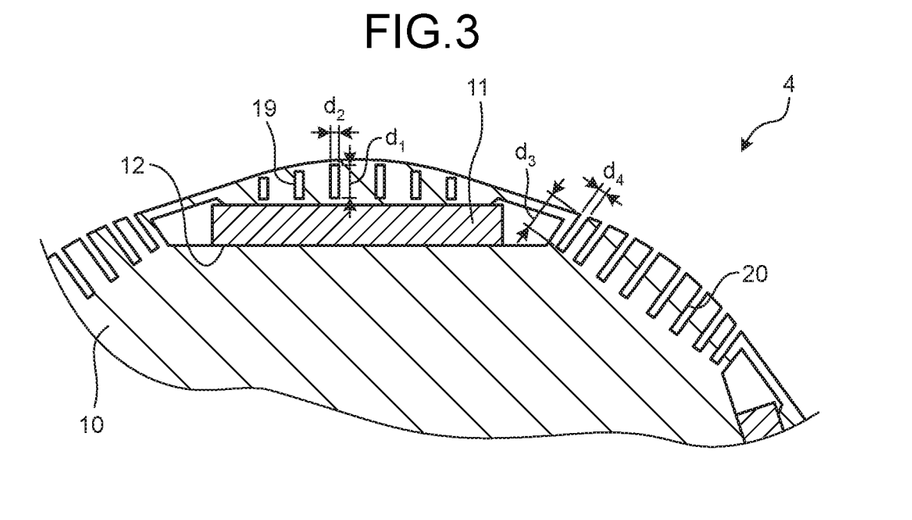
FIG. 3 is a partially enlarged view of FIG. 2.
Figure 4:
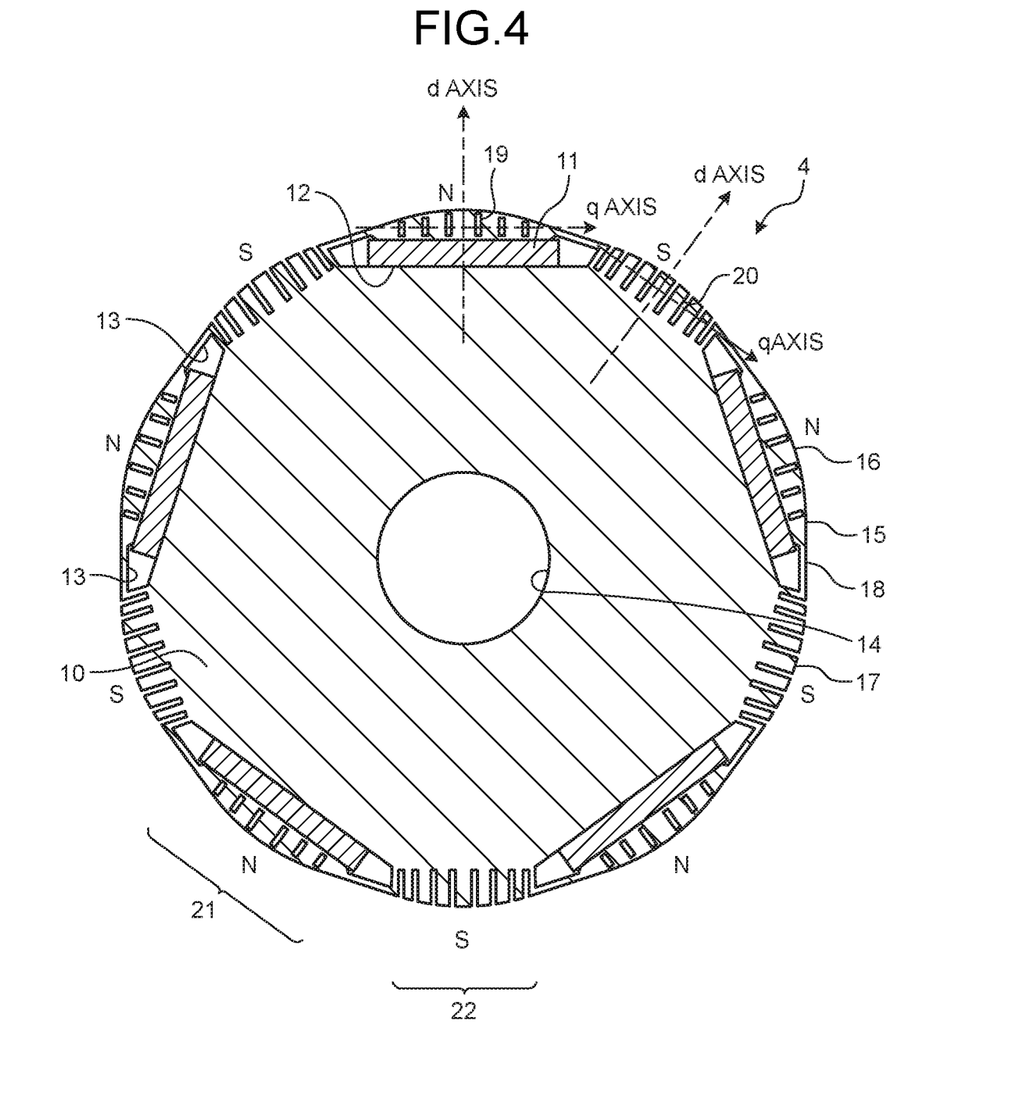
FIG. 4 is a sectional view for explaining a magnetic pole of the rotor according to the first embodiment.

FIG. 1 is a sectional view illustrating the configuration of an electric motor according to a first embodiment. FIG. 2 is a sectional view illustrating the configuration of a rotor according to this embodiment. FIG. 3 is a partially enlarged view of FIG. 2. FIG. 4 is a sectional view for explaining a magnetic pole of the rotor according to this embodiment. Note that FIG. 1 to FIG. 4 are sectional views taken along a surface perpendicular to the rotation axis of the electric motor.

As illustrated in FIG. 1, an electric motor 1 includes an annular stator 2 and an annular rotor 4 disposed on the inner side of the stator 2. The rotor 4 is rotatably disposed on the inner side of the stator 2 via an air gap 3 therebetween. The rotor 4 is disposed coaxially with the stator 2. Both the axes of the rotor 4 and the stator 2 coincide with the rotation axis of the electric motor 1. In an illustrated example, the electric motor 1 is, for example, a ten-pole 12-slot brushless motor.

The stator 2 includes an annular stator core 5 and coils 8 wound on the stator core 5. The stator core 5 includes an annular core back 5a and twelve teeth 5b projecting inwardly from the core back 5a in a radial direction. The twelve teeth 5b are disposed at equal intervals in a circumferential direction. The radial direction is the radial direction of the stator core 5. The circumferential direction is the circumferential direction of the stator core 5.

The stator core 5 is made from a soft magnetic material. Specifically, the stator core 5 is configured by stacking a plurality of electromagnetic steel plates. The thickness of the electromagnetic steel plate is generally 0.1 mm to 0.7 mm. A space between the teeth 5b adjacent to each other in the circumferential direction is called a slot 7. The coils 8 are wound on the teeth 5b via insulation members (not illustrated). The coils 8 are concentratedly wound or dispersedly wound.

The configuration of the rotor 4 is explained. As explained below, the rotor 4 is an internal magnet type and a consequent pole type.

The rotor 4 includes an annular rotor core 10 and five permanent magnets 11 disposed inside the rotor core 10.

The rotor core 10 includes five magnet holes 12 arrayed in a circumferential direction. The number of the magnet holes 12 is a half of the number of poles of the rotor 4. The circumferential direction is the circumferential direction of the rotor core 10. The five magnet holes 12 are arrayed at equal intervals in the circumferential direction. The five magnet holes 12 are disposed at equal distances from the rotation axis. The rotation axis coincides with the axis of the rotor core 10. The five magnet holes 12 extend in the axial direction of the rotor core 10 and through the rotor core 10. The magnet holes 12 are formed at the outer circumferential edge portion of the rotor core 10 and extend in the circumferential direction. The magnet holes 12 adjacent to each other are separated from each other. The rotor core 10 includes, in the center portion, a shaft hole 14 into which a shaft is inserted.

The rotor core 10 is made from a core material, which is a soft magnetic material. Specifically, the rotor core 10 is configured by stacking a plurality of electromagnetic steel plates. The thickness of the electromagnetic steel plate is generally 0.1 mm to 0.7 mm.

The five permanent magnets 11, which correspond one-to-one to the five magnet holes 12, are inserted into their respective corresponding magnet holes 12. The permanent magnet 11 has, for example, a rectangular flat shape in cross section. The thickness of the permanent magnet 11 is, for example, 2 mm.

The permanent magnet 11 is a rare earth magnet and is a neodymium sintered magnet containing Nd (neodymium)-Fe (iron)-B (boron) as main components.

Opposite end portions of the magnet hole 12 with the permanent magnet 11 disposed in the magnet hole 12 are two flux barrier sections 13, which are air gaps. That is, each of the circumferential opposite end faces of the permanent magnet 11 is in contact with the corresponding one of the two flux barrier sections 13 defined by the air layers. The flux barrier section 13 acts to allow the outer circumferential surface of the rotor 4 to have a magnetic flux density distribution in the form similar to a sine wave, and prevent a leak magnetic flux, i.e., prevent the magnetic fluxes of the permanent magnets 11 adjacent to each other from being short-circuited via the rotor core 10.

The rotor 4 includes ten magnetic poles arrayed on the outer circumferential surface of the rotor core 10 such that the polarities are alternate in the circumferential direction. In detail, the rotor 4 includes five first magnetic poles corresponding one-to-one to and formed by the five permanent magnets 11. The five first magnetic poles have the same polarities. The rotor 4 also includes five second magnetic poles each formed in the rotor core 10 between the permanent magnets 11 adjacent to one another. The second magnetic poles have polarities different from the polarities of the first magnetic poles. In the illustrated example, the first magnetic pole is an N pole and the second magnetic pole is an S pole. However, each of the first magnetic pole and the second magnetic pole may have the opposite polarity. The ten magnetic poles of the rotor 4 are disposed at equal intervals of angles in the circumferential direction with a pole pitch set to 360 degrees/10=36 degrees.

The thus arranged rotor 4 is the consequent pole type. The five permanent magnets 11, which amount to the half number of the poles of the rotor, give the five first magnetic poles. Further, the five second magnetic poles, which are the other half number of the poles of the rotor, are each formed in the core material of the rotor core 10 between the permanent magnets 11 adjacent to one another. The second magnetic pole is a so-called salient pole and is formed by magnetizing the rotor 4.

For the rotor 4, therefore, a first magnetic pole section 21, which is a magnet magnetic pole section including the permanent magnet 11 and having the first magnetic pole, and a second magnetic pole section 22, which is a core magnetic pole section not including the permanent magnet 11 but having the second magnetic pole, are alternately arrayed in the circumferential direction of the rotor 4. The consequent-pole-type rotor 4 has the number of poles which is an even number equal to or larger than four.

An external shape 15 of the rotor core 10 is a so-called "flower-like" circular shape. The "flower-like" circular shape as used herein is a shape having pole centers 16 and 17 at which the outer diameter of the rotor core 10 is the largest, and an inter-pole 18 at which the outer diameter of the rotor core 10 is the smallest. This "flower-like" circular shape includes an arcuate shape from each of the pole centers 16 and 17 to the inter-pole 18. The pole center 16 is the pole center of the first magnetic pole and the pole center 17 is the pole center of the second magnetic pole. In the illustrated example, the "flower-like" circular shape is the shape defined by ten petals having the same shapes and the same sizes and arranged at equal angles. The outer diameter of the rotor core 10 at the pole center 16 is thus equal to the outer diameter of the rotor core 10 at the pole center 17. Note that the width in the circumferential direction of the magnet hole 12 is wider than the pole pitch.

In this embodiment, the rotor core 10 includes sixth slits 19 provided inside the rotor core 10 and disposed on the outer side of the permanent magnet 11. The six slits 19 are provided for each of the permanent magnets 11. The outer side of the permanent magnet 11 is the outer side in the radial direction of the rotor core 10. That is, the six slits 19 are provided in the rotor core 10 between the permanent magnet 11 and the outer circumference of the rotor core 10. The slit 19 has a rectangular sectional shape and extends in the radial direction. A width $d_1$ in the radial direction of the slit 19 is larger than a width $d_2$ in the circumferential direction. The width in the radial direction is a width in a d-axis direction. The width in the circumferential direction is a width in a direction orthogonal to the radial direction, that is, the width in a q-axis direction. However, none of the six slits 19 reaches the outer circumference of the rotor core 10.

The closer to the pole center 16 the slit 19 is, the longer in the radial direction the six slit 19 is. The slits 19 are arranged symmetrically in the circumferential direction with the pole center 16 centered. That is, the width $d_1$ of the slit 19 is larger as the slit 19 is closer to the pole center 16. The width $d_2$ of the slit 19 is constant irrespective of its position in the circumferential direction of the slit 19. The six slits 19 extend in the axial direction of the rotor core 10 and through the rotor core 10.

Further, in this embodiment, the rotor core 10 includes eight slits 20 provided on the outer circumferential surface of the rotor core 10 and disposed between the permanent magnets 11 adjacent to each other. The eight slits 20 are provided for each region between the permanent magnets 11 adjacent to each other. The slit 20 has a rectangular sectional shape and extends in the radial direction. A width $d_3$ in the radial direction of the slit 20 is larger than a width $d_4$ in the circumferential direction. The width in the radial direction is the width in a d-axis direction. The width in the circumferential direction is the width in the direction orthogonal to the radial direction, that is, a q-axis direction. The slit 20 is a groove section opened to the outer circumferential surface.

The closer to the pole center 17 the slit 20 is, the longer in the radial direction the slit 20 is. The eight slits 20 are disposed symmetrically in the circumferential direction with the pole center 17 centered. That is, the width $d_3$ of the slit 20 is larger as the slit 20 is closer to the pole center 17. The width $d_4$ of the slit 20 is constant irrespective of its position in the circumferential direction of the slit 20. The eight slits 20 extend in the axial direction of the rotor core 10 and through the rotor core 10.

In the illustrated example, the number of the slits 20 between the permanent magnets 11 is larger than the number of the slits 19 on the outer side of the permanent magnet 11. A minimum of the width $d_3$ is larger than a maximum of the width $d_1$. That is, the width $d_1$ of the slit 19 closest to the pole center 16 is smaller than the width $d_3$ of the slit 20 closest to the inter-pole 18. Note that the width $d_2$ is equal to the width $d_4$. Therefore, a total area of the slits 20 between the permanent magnets 11 is larger than a total area of the slits 19 on the outer side of the permanent magnet 11. The total area is a sectional area taken along a cross section perpendicular to the rotation axis.

The electric motor 1 is driven at variable speed under PWM control by an inverter of a driving circuit (not illustrated). For an electric motor used in a compressor or an electric motor used in a fan of an air conditioner, a switching carrier of the inverter is generally selected from a range of 4 kilohertz to 22 kilohertz.

A description of an advantage provided by this embodiment is made in comparison with comparative examples. For the consequent-pole-type rotor, in general, magnetic imbalance is large between a magnet magnetic pole formed by a permanent magnet and a salient pole not formed by the permanent magnet. For the magnet magnetic pole, that is, the volume of a core material is relatively small due to the presence of the permanent magnet. As a result, the inductance in the magnet magnetic pole is smaller than the inductance in the salient pole, thereby causing the magnetic imbalance. The imbalance in the inductance is imbalance in a magnetic flux, which poses a problem of failure to provide a magnetic flux density distribution on the rotor surface with a sine wave shape, thus increasing vibration and noise. Note that the vibration includes the vibration in the rotational direction and the vibration in the radial direction.

The vibration in the radial direction is caused by imbalance in an attraction force between the stator and the rotor when a magnetic flux generated by an electric current flowing to the stator passes the stator core and the rotor core. Note that, in the following description, the magnetic flux generated by the electric current is sometimes referred to as "current magnetic flux" for the purpose of distinction from a magnet magnetic flux that is a magnetic flux generated by a magnet. The current magnetic flux flows to the rotor core from the stator core via an air gap, and an attraction force between the stator and the rotor is generated by this magnetic flux. At this point, if easiness of the flow of the magnetic flux, that is, the inductance among the magnetic poles is balanced, the attraction force between the stator and the rotor is balanced, such that an exciting force in the radial direction is not generated in the rotor as a whole.

For the consequent-pole-type rotor, in general, the current magnetic flux mainly flows to the rotor core portion on the outer side of the permanent magnet having the magnet magnetic pole. On the other hand, the salient pole, which lacks the permanent magnet, has the relatively large core portion. As a result, the current magnetic flux easily flows to the entire salient pole section, thereby causing the imbalance.

This imbalance is a significant problem for, in particular, a slot combination in which a pitch between the stator teeth and the magnetic poles of the rotor shifts in a rotating direction, such as 10-pole and 12-slot, 8-pole 9-slot, or 10-pole 9-slot. The imbalance is less significant for a slot combination of two-to-three sequence such as 8-pole 12-slot or 6-pole 9-slot. For such a slot combination, unfortunately, the problem of the imbalance is still significant when there is a manufacturing error such as the decentering rotor or a low circularity of the rotor.

Figure 5:
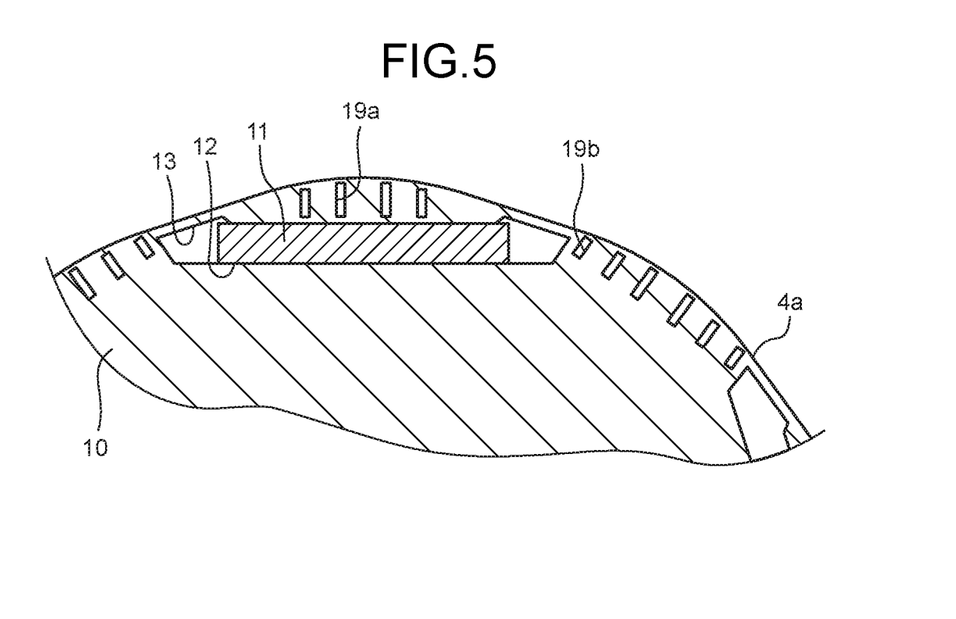
FIG. 5 is a partially enlarged view illustrating the configuration of a rotor according to a comparative example 1.
Figure 6:
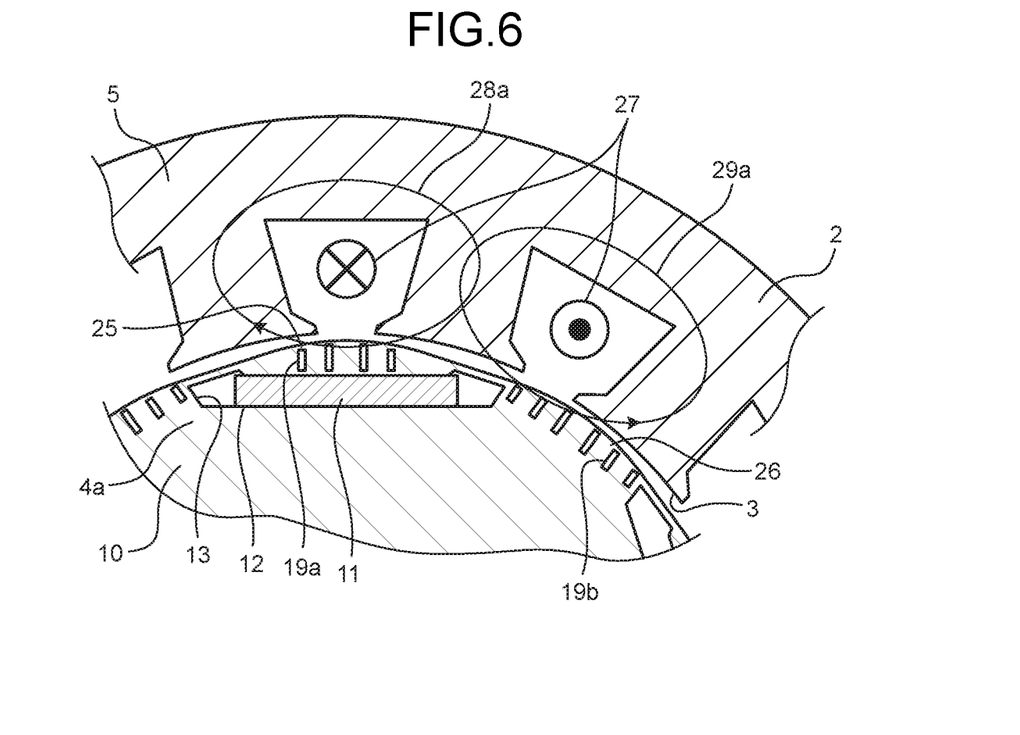
FIG. 6 is a partially enlarged view of an electric motor including the rotor according to the comparative example 1.

As illustrated in FIG. 5 and FIG. 6, thus, it is conceivable to prevent the imbalance in the inductance between the magnetic poles by providing slits on the rotor surface.

FIG. 5 is a partially enlarged view illustrating the configuration of a rotor according to a comparative example 1. FIG. 6 is a partially enlarged view of an electric motor including the rotor according to the comparative example 1. Note that, in FIG. 5 and FIG. 6, the same components as the components illustrated in FIG. 4 are denoted by the same reference numerals and signs.

As illustrated in FIG. 5, a rotor 4a according to the comparative example 1 includes four slits 19a provided inside the rotor core 10 and disposed on the outer side of the permanent magnet 11, and six slits 19b provided inside the rotor core 10 and disposed between the permanent magnets 11 adjacent to each other. That is, the rotor 4a according to the comparative example 1 is different from the rotor 4 according to this embodiment in that the slits 19b disposed between the permanent magnets 11 are provided inside the rotor core 10.

The slits 19a and 19b have an effect of regulating a way of a flow of a magnetic flux. The slits 19a and 19b can be disposed to further increase the magnetic flux between the permanent magnets 11, thereby providing a magnetic flux density distribution on the rotor surface with the form similar to the sine wave.

The use of such a configuration as the rotor 4a makes it possible to provide the magnetic flux density distribution on the rotor surface with the form similar to the sine wave and equalize the pole pitches, thus reducing a torque ripple that causes the vibration and noise.

Unfortunately, the configuration such as the rotor 4a achieves the prevention of the vibration in the rotating direction, but prevents the vibration in the radial direction to a limited degree for the reason explained below.

FIG. 6 illustrates an electric current 27 flowing to the stator 2, and magnetic fluxes 28a and 29a generated by the electric current 27 and flowing in the rotor core 10. The magnetic flux 28a flows in a thin section 25 between the slits 19a and the outer circumferential surface of the rotor 4a. Similarly, the magnetic flux 29a flows in a thin section 26 between the slits 19b and the outer circumferential surface of the rotor 4a. Since the slits 19a are not opened to the outer circumferential surface of the rotor core 10 unlike the slits 20 in this embodiment, the magnetic flux 29a flows in the thin section 26. In this case, the inductance in the salient pole is reduced to a limited degree.

If the area of the slits 19b is increased, it is possible to reduce the inductance to compensate for a magnetic flux flowing in the thin section 26. In this case, unfortunately, the slits 19b act as magnetic resistance of the magnet magnetic flux, which leads to a decrease in the magnet magnetic flux and a deterioration in electric motor efficiency. Note that the magnet magnetic flux is a magnetic flux generated from the permanent magnet 11.

Figure 7:
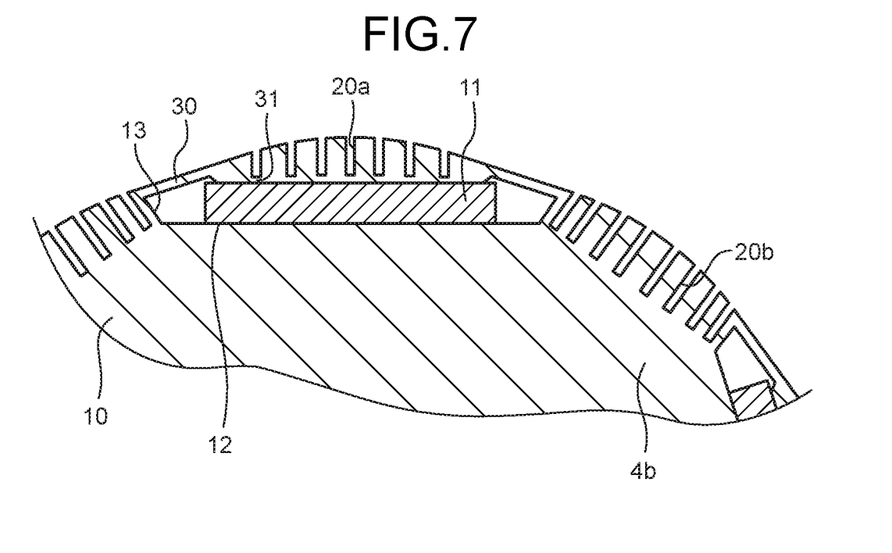
FIG. 7 is a partially enlarged view illustrating the configuration of a rotor according to a comparative example 2.

It is thus conceivable to prevent the imbalance in the inductance between the magnetic poles by providing slits opened to the rotor surface as illustrated in FIG. 7.

FIG. 7 is a partially enlarged view illustrating the configuration of a rotor according to a comparative example 2. Note that, in FIG. 7, the same components as the components illustrated in FIG. 5 are denoted by the same reference numerals and signs.

As illustrated in FIG. 7, a rotor 4b according to the comparative example 2 includes seven slits 20a provided on the outer circumferential surface of the rotor core 10 and disposed on the outer side of the permanent magnet 11, and eight slits 20b provided on the outer circumferential surface of the rotor core 10 and disposed between the permanent magnets 11 adjacent to each other in the circumferential direction. That is, the rotor 4b according to the comparative example 2 is different from the rotor 4 according to this embodiment in that the slits 20a disposed on the outer side of the permanent magnet 11 are provided on the outer circumferential surface of the rotor core 10.

Unfortunately, the slits 20a opened to the outer circumferential surface of the rotor core 10 and communicating with the air gap 3 reduces the strength of the rotor 4b with regard to a centrifugal force during the rotation. For the magnet magnetic pole, more specifically, the centrifugal force applied to the permanent magnet 11 and the core section on the outer side of the permanent magnet 11 by the rotation of the rotor 4b produces a stress on a thin bridge 30 between the outer circumferential surface of the rotor core 10 and the flux barrier section 13. In the presence of the slits 20a, bending moment occurs in a thin bridge 31 between the magnet hole 12 and the slits 20a, and would further decrease the strength of the thin bridge 30.

If the width in the radial direction of the thin bridge 30 is increased to increase resistance to the centrifugal force, a leak of the magnet magnetic flux increases, which leads to a decrease in a magnetic flux and a deterioration in electric motor efficiency. If the width in the radial direction of the thin bridge 31 is increased, the current magnetic flux easily flows and imbalance in a magnetic flux easily occurs.

For the salient pole, the centrifugal force by the rotation of the rotor 4b is received by the entire core section. Thus, the strength of the salient pole is so high as to provide a sufficient resistance to the centrifugal force although the slits 20b are opened to the outer circumferential surface of the rotor 4b.

In this embodiment, the second magnetic pole, which is the salient pole, has the slits 20 provided on the outer circumferential surface of the rotor core 10 to thereby greatly reduce the inductance. The first magnetic pole, which is the magnet magnetic pole, has the slits 19 provided inside the rotor core 10 to thereby reduce the inductance to a smaller degree. Consequently, a difference in inductance between the first magnetic pole and the second magnetic pole is small as compared to the comparative example 1.

In this embodiment, the slits 19 on the outer side of the permanent magnet 11 have no opening sections formed on the outer circumferential surface of the rotor core 10. Thus, the issue regarding the resistance to the centrifugal force as in the comparative example 2 does not arise. Since there is no thin bridges 30 and 31 as illustrated in FIG. 7 between the permanent magnets 11, the centrifugal force is not problematic. Thus, the slits 20 opened to the outer circumferential surface of the rotor core 10 do not affect the resistance to the centrifugal force.

Note that the slits 19 and 20 are desirably provided to be not the magnetic resistance to the magnet magnetic flux, but the magnetic resistance to the current magnetic flux. That is, the slits 19 and 20 are disposed in parallel to the magnet magnetic flux. That is, the slits 19 and 20 are elongated in the d-axis direction. On the other hand, the slits 19 and 20 are as long as possible in the q-axis direction orthogonal to the d axis such that the slits 19 and 20 are the magnetic resistances. The magnetic resistance in the q-axis direction reduces the q-axis inductance. Consequently, the current magnetic flux less easily flows in the rotor core 10, thereby reducing the imbalance in the q-axis inductance that is a main cause of vibration and noise. The slits 19 and 20 are provided such that the slits 19 and 20 are not the magnetic resistance in the d-axis direction. It is therefore possible to prevent a decrease in the magnetic force of the permanent magnet 11. Sizes of the slits 19 and 20 are set as appropriate on the basis of magnetic balance, strength, and productivity by mold press.

In this embodiment, the total area of the slits 20 between the permanent magnets 11 adjacent to each other is larger than the total area of the slits 19 on the outer side of the permanent magnet 11 in the radial direction of the rotor core 10. Consequently, it is possible to further prevent the imbalance in the inductance between the first magnetic pole and the second magnetic pole. The total area of the slits 19 and the total area of the slits 20 are set as appropriate on the basis of magnetic balance, strength, and productivity by mold press.

To set the total area of the slits 20 larger than the total area of the slits 19, the number of the slits 20 can be larger than the number of the slits 19, the width in the radial direction of the slits 20 can be larger than the width in the radial direction of the slits 19, or the width in the direction orthogonal to the radial direction of the slits 20 can be larger than the width in the direction orthogonal to the radial direction of the slits 19.

In this embodiment, the six slits 19 are provided for each of the permanent magnets 11 and the eight slits 20 are provided for each of the permanent magnets 11. However, the number of the slits 19 and the number of the slits 20 are not limited to these numbers. The number of the slits 19 and the number of the slits 20 are set as appropriate on the basis of magnetic balance, strength, and productivity by mold press.

Note that, when only balance of inductance is taken into account, it is more effective not to provide the slits 19 in the first magnetic pole sections 21 including the permanent magnets 11. Meanwhile, the slits 19, which prevent the current magnetic flux from easily flowing, reduce armature reaction that disturbs the magnet magnetic flux, thereby preventing the vibration and noise due to a high-order component of a magnetic flux in the disturbed magnetic flux. It is therefore desirable to provide the slits 19 in the first magnetic pole sections 21 including the permanent magnets 11. That is, the number of the slits 19 for each of the permanent magnets 11 and the number of the slits 20 for each space between the permanent magnets 11 can be at least one, respectively.

In this embodiment, the external shape 15 of the rotor core 10 is in the "flower-like" circular shape and the width in the circumferential direction of the magnet hole 12 is larger than the pole pitch. Consequently, it is possible to provide the surface magnetic flux density distribution of the rotor 4 with the form similar to the sine wave shape and further prevent vibration noise in the rotating direction.

In this embodiment, the outer diameter of the rotor core 10 at the pole center 16 is equal to the outer diameter of the rotor core 10 at the pole center 17. The method for preventing the imbalance in the inductance includes setting the outer diameter of the rotor core 10 at the pole center 17 to be smaller than the outer diameter of the rotor core 10 at the pole center 16, such that the length of the air gap 3 at the pole center 17 increases. In this embodiment, in contrast to such a method, it is possible to prevent the imbalance in the inductance without setting the different air gaps 3 at the first magnetic pole and the second magnetic pole.

Note that, when the different air gaps 3 are set at the first magnetic pole and the second magnetic pole, a jig for holding the rotor 4 in manufacturing the electric motor needs to be not circular but have a shape providing against the different outer diameters. In using a gap gauge for checking the air gap 3, the gap gauge needs to be provided for each of the first magnetic pole and the second magnetic pole. This results in the number of the working steps increasing.

In general, the electric motor for the compressor or the electric motor for the fan of the air conditioner uses not a ferrite sintered magnet, a ferrite bond magnet, or a Sm (samarium)-Fe (iron)-B (boron) bond magnet, but a neodymium sintered magnet containing mainly Nd (neodymium)-Fe (iron)-B (boron) and having stronger magnetic forces, from the viewpoint of the improvement of efficiency.

Unfortunately, it is requested that the amount of use and machining expenses of permanent magnet 11 be reduced because Nd used in the neodymium sintered magnet and rare earth elements of Dy (dysprosium) and Tb (terbium) added to the neodymium sintered magnet for improving a coercive force are expensive and are less steadily available.

In general, the permanent magnet 11 is formed by cutting a block of mass and machining the cut mass into a designated shape. For this reason, the material yield decreases as the permanent magnet 11 is thinner and smaller, and thus the productivity is deteriorated. The use of the increased number of the permanent magnets 11 per one electric motor increases the manufacturing cost by the machining expenses of the magnet.

In order to reduce the cost of the electric motor 1, therefore, it is desirable to reduce the number of the permanent magnets 11 to the extent that the permanent magnets provide the required amount of the magnetic flux. At this point, the volume per one permanent magnet 11 can be increased without increasing a total amount of use of the permanent magnets 11 per one electric motor 1. Increasing the size of the permanent magnet 11 without exceeding the proper value of the production facility decreases the machining expense ratio, such that the total amount of machining expenses of the permanent magnet 11 decreases to thereby reduce the cost per one electric motor 1 even if the total amount of use of the permanent magnets 11 per one electric motor 1 remains the same.

Since the rotor 4 of this embodiment is the consequent pole type in which the number of the permanent magnets 11 is a half of the number of the poles, the amount of use and machining expenses of the permanent amount 11 can be reduced compared with the case where all the magnetic poles are formed by the permanent magnets 11.

As explained above, according to this embodiment, it is possible to provide the electric motor 1 capable of reducing the cost, the vibration, and the noise.

Note that although the electric motor 1 is the electric motor of 10-pole and 12-slot in this embodiment, the electric motor 1 is not limited to this electric motor. For example, a combination of the number of poles and the number of slots is selected according to a use and performance of the electric motor 1 like 10-pole 9-slot, 8-pole 12-slot, 8-pole 9-slot, 6-pole 9-slot, or 4-pole 6-slot.

Although the permanent magnet 11 is the neodymium sintered magnet in this embodiment, the permanent magnet 11 can be a rare earth magnet other than the neodymium sintered magnet or can be a permanent magnet other than the rare earth magnet.

Second Embodiment

Figure 8:
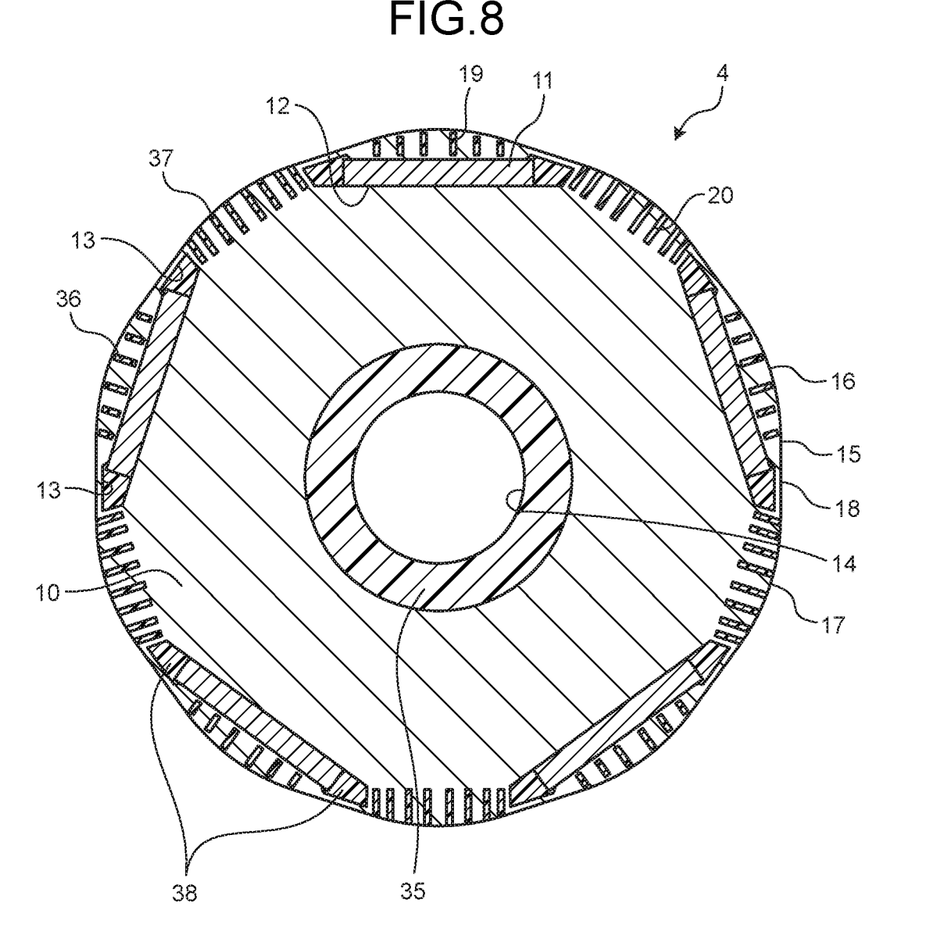
FIG. 8 is a sectional view illustrating the configuration of a rotor according to a second embodiment.
Figure 9:
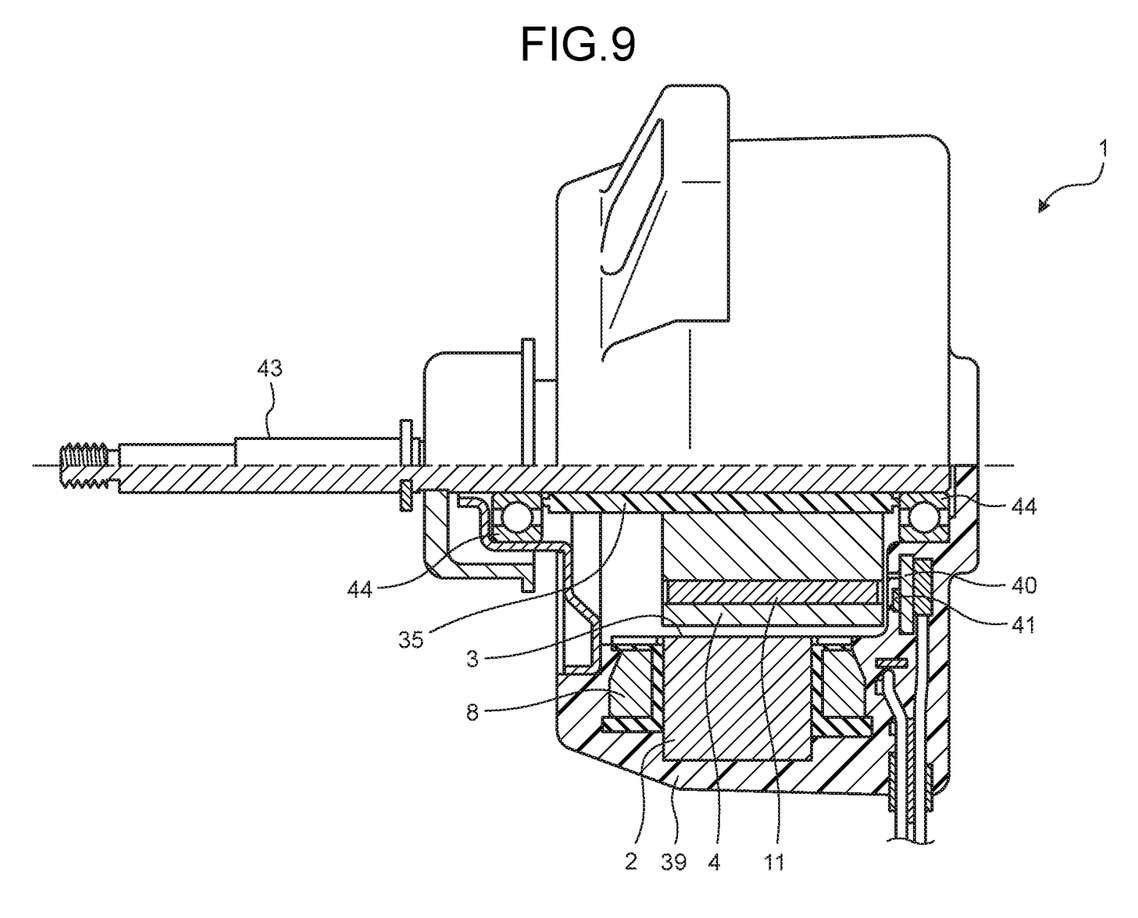
FIG. 9 is a diagram illustrating the configuration of an electric motor according to the second embodiment.

FIG. 8 is a sectional view illustrating the configuration of a rotor according to a second embodiment. FIG. 9 is a diagram illustrating the configuration of an electric motor according to this embodiment. Note that FIG. 8 is a sectional view taken along a surface perpendicular to the rotation axis of the electric motor. FIG. 9 includes a sectional view taken along a surface including the rotation axis of the electric motor. Note that, in FIG. 8 and FIG. 9, the same components as the components illustrated in FIG. 1 to FIG. 3 are denoted by the same reference numerals and signs. In addition to the components explained in the first embodiment, FIG. 9 illustrates a sensor board 40, a rotation detecting unit 41 mounted on the sensor board 40, a shaft 43 inserted through the shaft hole 14, a pair of bearings 44 that supports the shaft 43, a resin section 35 explained below, and a resin section 39 that covers the stator 2.

For the rotor 4 according to this embodiment, as illustrated in FIG. 8, the slits 19 are filled with resin. Resin sections 36, which are first resin sections, are provided in the slits 19. The slits 20 are filled with resin. Resin sections 37, which are second resin sections, are provided in the slits 20. The resin sections 36 and 37 are fixed to the rotor core 10.

The flux barrier sections 13 are filled with resin. Resin sections 38, which are third resin sections, are provided in the flux barrier sections 13. Note that, although not illustrated in the figure, the magnet holes 12 are also filled with resin together with the flux barrier sections 13.

As illustrated in FIG. 8 and FIG. 9, an annular resin section 35 is provided on the inner circumferential surface of the rotor core 10. The shaft hole 14 is provided in the resin section 35.

Note that the resin is, for example, thermoplastic resin, which is polybutylene terephthalate.

By thus filing the slits 19 and 20 with the resin in this way, it is possible to increase the resistance to the centrifugal force of the rotor 4.

By filling the flux barrier sections 13 with the resin, further, it is possible to further increase the resistance to the centrifugal force of the rotor 4. Note that, because the magnet holes 12 are filled with the resin together with the flux barrier sections 13, it is possible to successfully fix the permanent magnets 11, thereby preventing the noise due to the magnetic vibration of the permanent magnet 11.

Since the resin section 35 is provided between the shaft 43 and the rotor core 10, the rotor core 10 and the shaft 43 are insulated from each other and the stray capacitance is reduced. Consequently, it is possible to prevent a high-frequency current flowing via stray capacitances among the stator 2, the bearings 44, the shaft 43, the rotor 4, and the stator 2 from corroding the bearings 44 and thus shortening the lives of the bearings 44.

Third Embodiment

Figure 10:
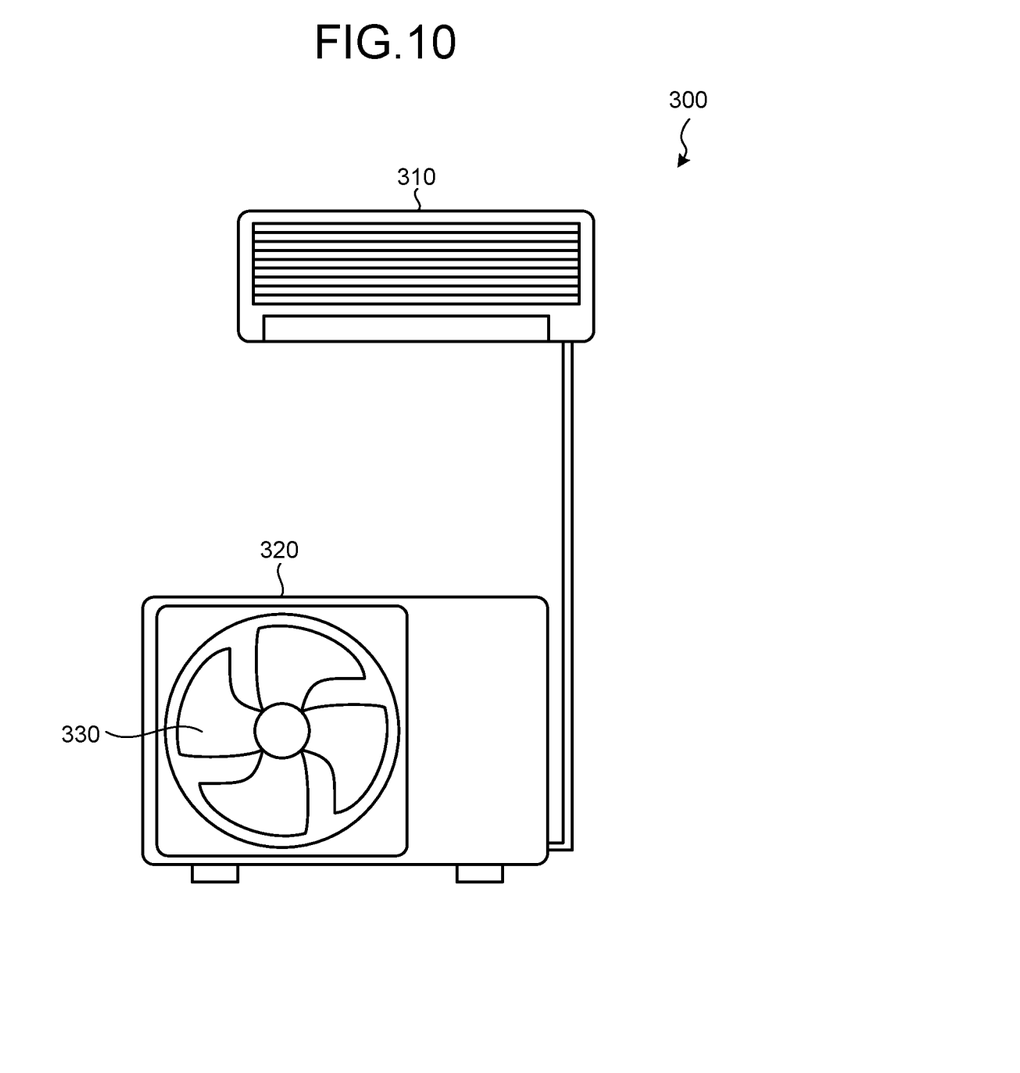
FIG. 10 is a diagram illustrating an example of the configuration of an air conditioner according to a third embodiment.

FIG. 10 is a diagram illustrating an example of the configuration of an air conditioner according to this embodiment. An air conditioner 300 includes an indoor unit 310 and an outdoor unit 320 connected to the indoor unit 310. An indoor unit blower (not illustrated) is mounted on the indoor unit 310. An outdoor unit blower 330 is mounted on the outdoor unit 320. A compressor (not illustrated) is mounted on the outdoor unit 320. In the blowers and the compressor, the electric motor 1 in the first or second embodiment is used.

By using the electric motor 1 in the first or second embodiment as a driving source of the blowers and the compressor of the air conditioner 300 in this way, it is possible to reduce the cost, vibration, and noise of the air conditioner 300.

Note that the electric motor 1 according to the first or second embodiment can be mounted on an electric apparatus other than the air conditioner as well. In this case, it is possible to obtain the same effects as the effects in this embodiment.

The configurations explained in the embodiments indicate examples of the content of the present invention. The configurations can be combined with other publicly-known technologies. A part of the configurations can be omitted or changed in a range not departing from the spirit of the present invention.

The invention claimed is:

1. An electric motor comprising:
an annular stator; and
a consequent-pole-type rotor comprising:
   an annular rotor core disposed on an inner side of the annular stator, and
   a plurality of permanent magnets disposed inside the annular rotor core and arrayed in a circumferential direction of the annular rotor core, wherein
the annular rotor core has:
   at least one first slit provided inside the annular rotor core, the at least one first slit being disposed on an outer side of each of the permanent magnets in a radial direction of the annular rotor core, and
   at least one second slit provided on an outer circumferential surface of the annular rotor core, the at least one second slit being disposed between closest neighboring permanent magnets among the permanent magnets, and wherein
a width of the at least one second slit in a direction orthogonal to the radial direction of the rotor core being larger than a width of the at least one first slit in the direction orthogonal to the radial direction.

2. The electric motor according to claim 1, wherein a total area of the at least one second slit is larger than a total area of the at least one first slit.

3. The electric motor according to claim 2, wherein a number of the at least one second slit is larger than a number of the at least one first slit.

4. The electric motor according to claim 2, wherein a width of the at least one second slit in the radial direction of the rotor core is larger than a width of the at least one first slit in the radial direction.

5. The electric motor according to claim 1, wherein a first magnetic pole formed by the permanent magnet and a second magnetic pole formed between the adjacent permanent magnets are alternately arrayed on the outer circumferential surface of the rotor core, and an outer diameter of the rotor core at a pole center of the first magnetic pole is equal to an outer diameter of the rotor core at a pole center of the second magnetic pole.

6. The electric motor according to claim 1, wherein
a first resin section is provided in the at least one first slit, and
a second resin section is provided in the at least one second slit.

7. The electric motor according to claim 1, wherein
the at least one first slit includes no opening section on the outer circumferential surface of the rotor core, and
the at least one second slit is opened to the outer circumferential surface of the rotor core.

8. An air conditioner comprising the electric motor according to claim 1.

9. An electric motor comprising:
an annular stator; and
a consequent-pole-type rotor comprising:
   an annular rotor core disposed on an inner side of the annular stator, and
   a plurality of permanent magnets disposed inside the annular rotor core and arrayed in a circumferential direction of the annular rotor core, wherein
the annular rotor core has:
   at least one first slit provided inside the annular rotor core, the at least one first slit being disposed on an outer side of each of the permanent magnets in a radial direction of the annular rotor core, and at least one second slit provided on an outer circumferential surface of the annular rotor core, the at least one second slit being disposed between closest neighboring permanent magnets among the permanent magnets, and wherein the at least one first slit including no opening section on the outer circumferential surface of the rotor core, the at least one second slit being opened to the outer circumferential surface of the rotor core, flux barrier sections are provided at opposite end portions of the permanent magnet, and an end portion of each of the flux barrier sections is parallel to the second slit adjacent to the end portion; and wherein a width of the at least one second slit in a direction orthogonal to the radial direction of the rotor core is larger than a width of the at least one first slit in the direction orthogonal to the radial direction.

10. The electric motor according to claim 9, wherein a total area of the at least one second slit is larger than a total area of the at least one first slit.

11. The electric motor according to claim 10, wherein a number of the at least one second slit is larger than a number of the at least one first slit.

12. The electric motor according to claim 10, wherein a width of the at least one second slit in the radial direction of the rotor core is larger than a width of the at least one first slit in the radial direction.

13. The electric motor according to claim 9, wherein a first magnetic pole formed by the permanent magnet and a second magnetic pole formed between the adjacent permanent magnets are alternately arrayed on the outer circumferential surface of the rotor core, and an outer diameter of the rotor core at a pole center of the first magnetic pole is equal to an outer diameter of the rotor core at a pole center of the second magnetic pole.

14. The electric motor according to claim 9, wherein
a first resin section is provided in the at least one first slit, and
a second resin section is provided in the at least one second slit.

15. An air conditioner comprising the electric motor according to claim 9.

* * * * *